United States Patent
Kanbe et al.

[11] Patent Number: 5,500,750
[45] Date of Patent: Mar. 19, 1996

[54] MANUFACTURING METHOD OF REFLECTION TYPE LIQUID CRYSTAL DISPLAY DEVICES HAVING LIGHT SHIELD ELEMENTS AND REFLECTIVE ELECTRODES FORMED OF SAME MATERIAL

[75] Inventors: Makoto Kanbe, Tenri; Seiichi Mitsui, Nara, both of Japan

[73] Assignee: Sharp Kabushiki Kaisha, Osaka, Japan

[21] Appl. No.: 216,628

[22] Filed: Mar. 23, 1994

[30] Foreign Application Priority Data

Mar. 24, 1993 [JP] Japan .................. 5-65653

[51] Int. Cl.⁶ .................... G02F 1/136; G02F 1/1335; G02F 1/1343
[52] U.S. Cl. .................. 359/58; 359/59; 359/60; 359/70; 359/79; 359/87
[58] Field of Search .................. 359/58, 60, 59, 359/67, 79, 70, 87; 430/20; 445/24; 257/72, 59; 345/91, 92

[56] References Cited

U.S. PATENT DOCUMENTS

| | | | |
|---|---|---|---|
| 4,648,691 | 3/1987 | Oguchi et al. | 359/75 |
| 4,759,610 | 7/1988 | Yanagisawa | 359/59 |
| 5,130,829 | 7/1992 | Shannon | 359/59 |
| 5,181,132 | 1/1993 | Shindo et al. | 359/58 |
| 5,327,001 | 7/1994 | Wakai et al. | 359/59 |
| 5,365,355 | 11/1994 | Hastings, III et al. | 359/87 |
| 5,414,547 | 5/1995 | Matsuo et al. | 359/59 |

FOREIGN PATENT DOCUMENTS

| | | |
|---|---|---|
| 0084930 | 8/1983 | European Pat. Off. |
| 0495679 | 7/1992 | European Pat. Off. |
| 0536898 | 4/1993 | European Pat. Off. |
| 0586220 | 3/1994 | European Pat. Off. |
| 57-20778 | 2/1982 | Japan. |

OTHER PUBLICATIONS

D. White et al., *J. Appl. Phys.*, 45:4718–4723 (1974).
T. Koizumi et al., *Proceedings of the SID*, 29(2):157–160 (1988).

*Primary Examiner*—William L. Sikes
*Assistant Examiner*—Tai V. Duong
*Attorney, Agent, or Firm*—David G. Conlin; Peter F. Corless

[57] ABSTRACT

It is an object of the invention to improve the display quality of a reflection type liquid crystal display device. A gate bus wiring, a source bus wiring, and a TFT are formed on an insulating substrate, and an organic insulating film having bumps is formed on them. A light shield film is formed in the region above the TFT on the surface of the organic insulating film, and a reflection electrode is formed in the other region. The reflection electrode is separated from the light shield film by a gap. An orientation film is further formed on these components complete one substrate. The one substrate is bonded through a liquid crystal layer to the other substrate having a light emitting insulating substrate, a color filter, a transparent electrode, and an orientation film.

3 Claims, 12 Drawing Sheets

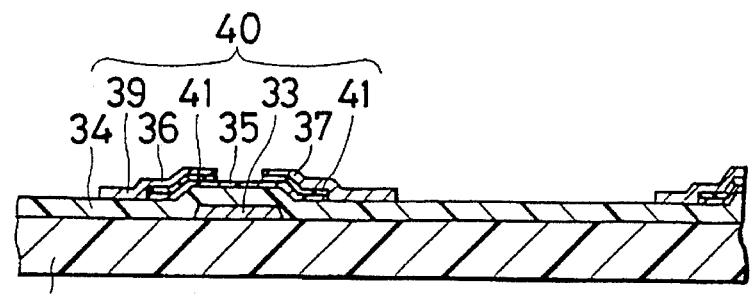
Fig. 4 (1)
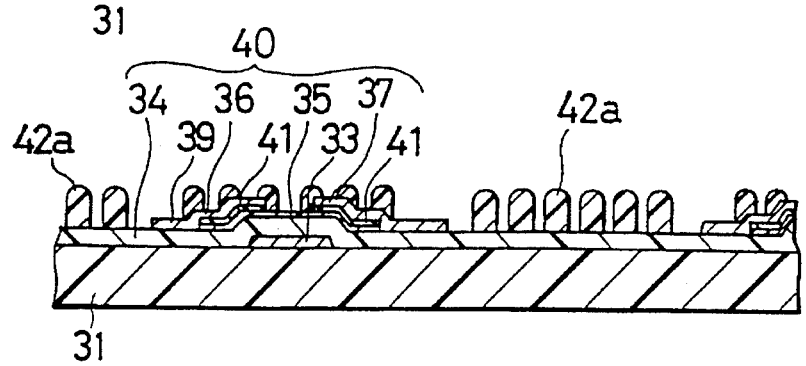
Fig. 4 (2)
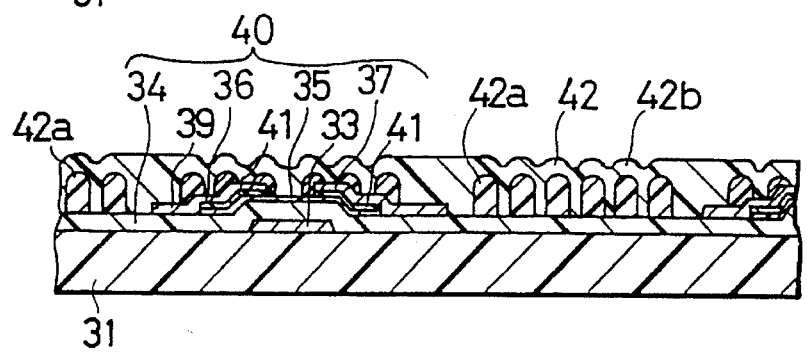
Fig. 4 (3)
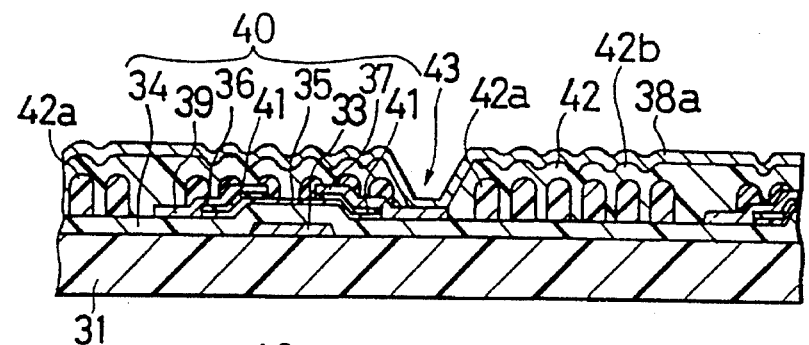
Fig. 4 (4)
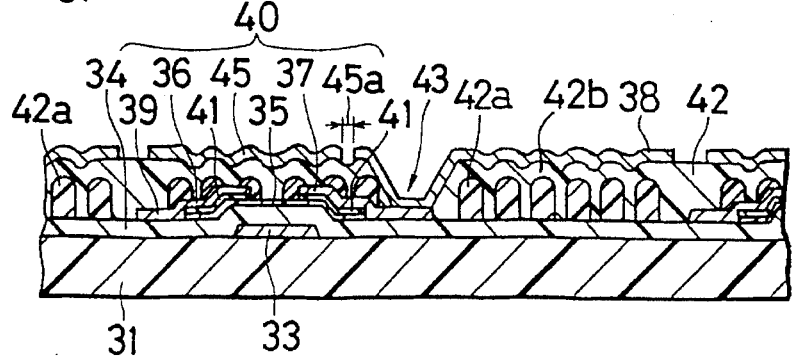
Fig. 4 (5)

Fig.7 (1) 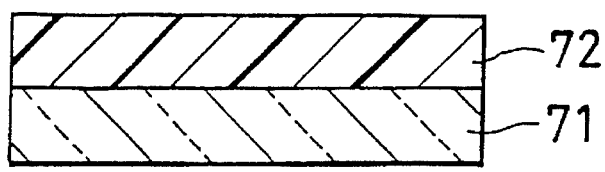
Fig.7 (2) 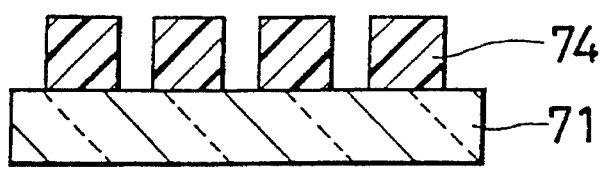
Fig.7 (3)
Fig.7 (4) 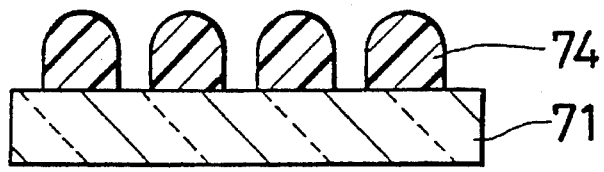
Fig.7 (5) 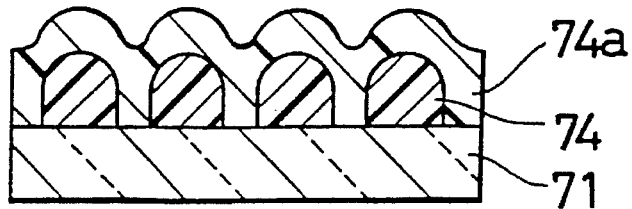
Fig.7 (6) 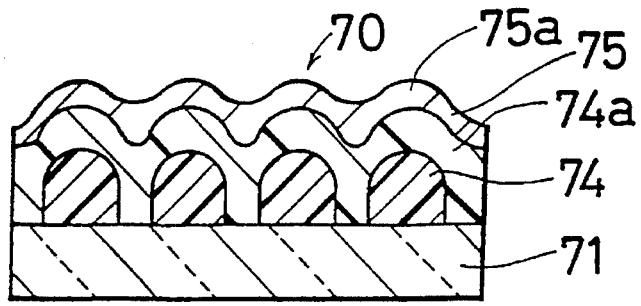

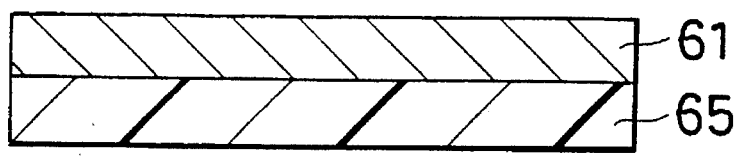
Fig.14 (1)
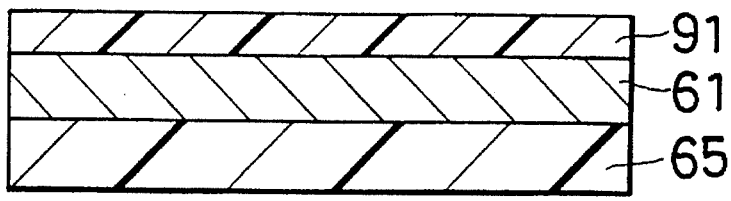
Fig.14 (2)
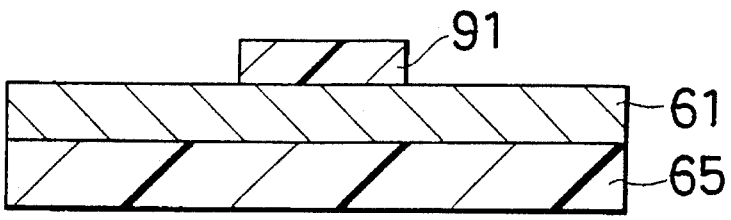
Fig.14 (3)
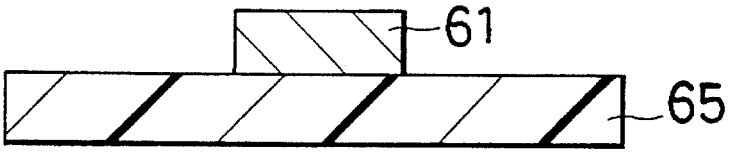
Fig.14 (4)
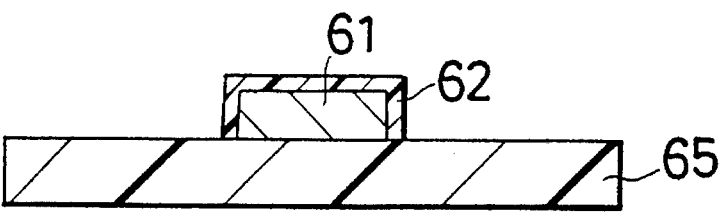
Fig.14 (5)
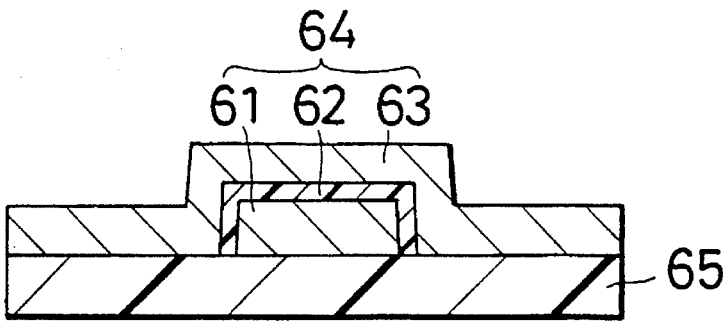
Fig.14 (6)

MANUFACTURING METHOD OF REFLECTION TYPE LIQUID CRYSTAL DISPLAY DEVICES HAVING LIGHT SHIELD ELEMENTS AND REFLECTIVE ELECTRODES FORMED OF SAME MATERIAL

BACKGROUND OF THE INVENTION

1. Field of the Invention

The present invention relates to a reflection type liquid crystal display device in which an image is displayed by reflecting light incident from the outside, and to a method for manufacturing the device.

2. Description of the Related Art

Recently, the application of a liquid crystal display device to word processors, lap top personal computers, pocket televisions and others is rapidly expanding. In particular, among liquid crystal display devices, a reflection type liquid crystal display device in which an image is displayed by reflecting light incident from the outside is highly attractive because it can be constructed in a reduced thickness and weight, and the amount of consumed electric power is low due to no backlight.

Conventionally, in a reflection type liquid crystal display device, the TN (twisted nematic) method or the STN (super-twisted nematic) method has been employed. In these methods, however, about half of a light intensity of natural light can not be utilized for displaying due to a polarizer, which causes a problem that the display is relatively dark.

To solve the problem, a display mode has been proposed in which no polarizer is used to effectively utilize natural light. An example of such a display mode is the phase transition type guest-host method (D. L. White and G. N. Taylor: J. Appl. Phys. 45 4718, 1974). In this mode, the cholesteric-nematic phase transition phenomenon due to an electric field is utilized. Also, a reflection type multicolor display is proposed, in which a micro color filter is additionally utilized in the method. (Tohru Koizumi and Tatsuo Uchida, Proceedings of the SID, Vol. 29/2, 157, 1988).

In order to obtain a brighter display in such a mode without requiring a polarizer, it is necessary to increase the intensity of light scattering in a direction perpendicular to the display screen, with respect to light incident at any angle. For this purpose, it is necessary to produce a reflector having an optimum reflective characteristic. The above publication discloses a reflector which is produced by toughening the surface of a substrate made of glass or the like with an abrasive, varying the time of etching with hydrofluoric acid to control the surface roughness, and forming a silver thin film on the rough surface.

In the reflector disclosed in the publication, the irregularities can not be uniform in shape because the irregularities are formed by grinding the glass substrate with an abrasive. The reflector has another problem that the reproducibility of the shape of the irregularities is poor. In the case of using such a glass substrate, consequently, it is impossible to provide a reflection type liquid crystal display with excellent reproducibility and an optimum reflective characteristic.

FIG. 15 is a plan view showing an insulating substrate 2 having a thin film transistor (hereinafter abbreviated as "TFT") 1 which is a switching element used in an active matrix system, and FIG. 16 is a sectional view showing the insulating substrate 2 as taken along line X1—X1 of FIG. 15. Plural gate bus wirings 3 made of chromium, tantalum or the like are disposed in parallel on the insulating substrate 2 made of glass or the like, and a gate electrode 4 is branched off from the gate bus wiring 3. The gate bus wiring 3 functions as a scanning signal line.

A gate insulating film 5 made of a silicon nitride ($SiN_x$), a silicon oxide ($SiO_x$) or the like is formed on the entire surface of the insulating substrate 2 to cover the gate electrode 4. On a gate insulating film 5 above the gate electrode 4, formed is a semiconductor layer 6 made of amorphous silicon (hereinafter abbreviated as "a-Si"), polycrystalline silicon, CdSe or the like. A source electrode 7 made of titanium, molybdenum, aluminum or the like is superposed on one end of the semiconductor layer 6. A drain electrode 8 made of titanium, molybdenum, aluminum or the like in the same manner as the source electrode 7 is superposed on the other end of the semiconductor layer 6. A picture element electrode 9 made of, for example, ITO (indium tin oxide) is superposed on one end of the drain electrode 8 that is opposite to the end on which the semiconductor layer 6 is superposed.

As shown in FIG. 15, a source bus wiring 10 is connected to the source electrode 7. The source bus wiring 10 cross the gate bus wiring 3 through the gate insulating film 5 therebetween, and functions as an image signal line. The source bus wiring 10 also is made of the same metal as that of the source electrode 7. A TFT 1, which functions as a switching element, comprises the gate electrode 4, the gate insulating film 5, the semiconductor layer 6, the source electrode 7, and the drain electrode 8.

When the insulating substrate 2 having the TFT 1 shown in FIGS. 15 and 16 is to be applied to a reflection type liquid crystal display device, the picture element electrode 9 is made of a metal having light reflectivity such as aluminum or silver, to be employed as a reflector.

Employing the picture element electrode 9 as a reflector has advantages that the thickness can be reduced and degrading of display due to parallax is small as compared with the case where a reflector is separately disposed on the side of the insulating substrate 2 opposite to the picture element electrode 9.

In order to further improve the reflective characteristic, irregularities are formed on the surface of the picture element electrode 9 superposed on the gate insulating film 5 as a consequence of forming the irregularities on the surface of the gate insulating film 5. Usually, however, it is difficult to uniformly form irregularities on the surface of the gate insulating film 5 made of an inorganic substance.

As described above, a semiconductor layer 6 is made of a-Si, polycrystalline silicon, CdSe or the like. The semiconductor layer 6 made of a-Si, in particular, has an advantage that it can be uniformly formed at a low temperature into that of a large area, compared with the other materials. However, it has a characteristic that light photoelectric current is generated. To be more precise, though the band gap of Si is 1.1 eV, holes and electrons are hardly generated in Si because it is an indirect transition type material. On the other hand, a-Si has a high probability of generation of holes and electrons due to levels in band gaps of a-Si, and therefore holes and electrons are easily generated by virtue of light. Therefore, when light enters the TFT 1, therefore, the TFT 1 is driven to operate by virtue of the light, so that it cannot properly function as a switching element. This causes inconvenient phenomena such as that an undesirable image signal is applied to the picture element electrode 9, thereby producing a disadvantage that the display quality is impaired. In a substrate opposing the insulating substrate 2, therefore, it is usual that a black matrix which is light shielding means is formed in the portion of the substrate which faces the TFT 1. However, it is difficult to completely shield light via the black matrix because of such problems that the accurate positioning is required, and that obliquely incoming light cannot be shielded.

As shown in FIGS. 15 and 16, in order to prevent the picture element electrode 9 and the source bus wirings 10 from being electrically connected to each other, they are formed so as to be separated from each other by a gap 9a. When the source electrode 7 and the drain electrode 8 are electrically connected to each other, moreover, the TFT 1 cannot function as a witching element. Therefore, the picture element electrode 9 cannot be formed on the TFT 1, resulting in that the area of the picture element electrode 9 is small. This causes a problem in that the luminace is low and therefore the display quality is impaired.

SUMMARY OF THE INVENTION

It is an object of the invention to provide a reflection type liquid crystal display device in which the display quality is improved, and a method for manufacturing the device.

The invention provides a reflection type liquid crystal display device comprising a pair of substrates opposed to each other through a liquid crystal layer, wherein at least one of the substrates transmits light, one of the substrates comprises: an insulating substrate; a picture element electrode which is disposed in each of plural picture element regions on the liquid crystal layer side of the insulating substrate and functions as a reflector for reflecting light incident from an other one of the substrates which transmits light; and a switching element portions for applying a voltage for displaying to the picture element electrode, and the other one of the substrates comprises: a transparent insulating substrate; and a transparent common electrode which covers an almost entire surface of the light transmitting insulating substrate on the liquid crystal layer side, characterized in that the one substrate further comprises an insulating film which is disposed in a region including the switching element portion, each of the picture element electrodes is disposed in a predetermined region in the respective picture element region on the liquid crystal layer side of the insulating film, and a light shield film is disposed in a region other than the predetermined region in the respective picture element region on the liquid crystal layer side of the insulating film to be separated from the respective picture element electrode by a gap.

The invention is characterized in that the light shield film has light reflectivity.

The invention is characterized in that the insulating film has bumps on a surface.

The invention is characterized in that the bumps are randomly arranged.

The invention is characterized in that the bumps are formed into a tapered shape and tip portions thereof have a spherical shape.

The invention is characterized in that the bumps are identical or different in size.

The invention is characterized in that the insulating film contains a photosensitive resin.

In another aspect of the invention, the invention provides a method for manufacturing a reflection type liquid crystal display device comprising a pair of substrates opposed to each other through a liquid crystal layer, wherein, one of the substrates comprises: an insulating substrate; a picture element electrode which is disposed in each of plural picture element regions on the liquid crystal layer side of the insulating substrate, and functions as a reflector for reflecting light incident from an other of the substrates which transmits light; and a switching element portion for applying a voltage for displaying to the picture element electrode, the method comprising steps of:

forming an insulating film in a region including the switching element portion on the liquid crystal layer side of the insulating substrate; and forming a picture element electrode in a predetermined region in each picture element region on the liquid crystal layer side of the insulating film, to be separated from each other by a gap, and forming a light shield film in a region other than the predetermined region in each picture element region, to be separated from each picture element electrode by a gap.

The invention is characterized in that a metal film having light reflectivity is formed on the liquid crystal layer side of the insulating film, and the metal film is patterned to form the picture element electrode and the light shield film.

The invention is characterized in that bumps are formed on a surface of the insulating film.

The invention is characterized in that the bumps are formed by; applying a photosensitive resin in a region including the switching element portion on the liquid crystal layer side of the insulating substrate; exposing the photosensitive resin to light through light shield means in which circular light shielding regions are randomly arranged; thermally treating after development; and forming the insulating film on the obtained plural bumps and along the plural bumps.

According to the invention, the reflection type liquid crystal display device has a configuration wherein a pair of substrates at least one of which is transparent are opposed to each other through a liquid crystal layer. One of the substrates comprises: an insulating substrate; picture element electrodes which are respectively disposed in plural picture element regions on the liquid crystal layer side of the insulating substrate, and which function as reflectors; and switching element portions. An insulating film is formed in a region including the switching element portions on the liquid crystal layer side of the insulating substrate, picture element electrodes are formed on the liquid crystal layer side of the insulating film and in a predetermined region in each picture element region, to be separated from each other by a gap, and a light shield film is formed in a region other than the predetermined region in each picture element region on the liquid crystal layer side of the insulating film, to be separated from each picture element electrode by a gap. The other one of the substrates comprises a light transmitting insulating substrate, and a common electrode which covers a substantially entire surface of the liquid crystal layer side of the light transmitting insulating substrate.

The switching element portion, which may be realized by a thin film transistor or the like, applies a voltage for displaying to the picture element electrode. This voltage controls the orientation state of the liquid crystal so that light entering from the other substrate is allowed to pass therethrough or blocked. Light which has passed through the liquid crystal layer is reflected by the picture element electrode which is a reflector and then emitted from the display device, resulting in a bright display. When the entering light is blocked, a dark display is obtained.

The picture element electrode is formed on the liquid crystal layer side of the insulating film which is formed in the region including the switching element portion on the crystal layer side of the insulating substrate which constitutes the one substrate. The picture element electrodes is formed in a predetermined region in the picture element region, separated from an adjacent picture element electrode by such an extent of gap that they can be electrically insulated from each other, and more precisely in a region where no a channel (current path) is formed between the switching element portions and the picture element electrodes and therefore they are not electrically connected to each other. In the region other than the predetermined region in the respective picture element regions, a light shield film is formed leaving between the light shield film and the picture element electrode such an extent of gap that they can be electrically insulated from each other.

Therefore, light entering a switching element portion is shielded by the light shield film from entering the switching element portion, thereby preventing the switching element portion from being driven to operate by light and failing to properly operate as a switching element. Since the light shield film is formed on the liquid crystal layer side of the insulating film of the insulating substrate, the light shield film can shield also light which obliquely enters, and can shield light regardless of the positioning accuracy of the bonding of the substrates. Furthermore, a gap is formed between the picture element electrode and the light shield film, and therefore, even when the light shield film is made of an electrically conductive material, it is achieved to prevent flowing of electric current from the picture element electrode to the light shield film. This eliminates the problem that, due to formation of a channel between the switching element portion and the light shield film, the characteristics of the switching element portion are impaired to lower the display quality. Additionally, since the picture element electrode is formed on the liquid crystal layer side of the insulating film, the area of the picture element electrode can be enlarged as far as it is electrically insulated from an adjacent picture element electrode. This contributes to an increase in intensity of the reflected light, so that the luminance is improved.

According to the invention, the light shield film has light reflectivity. The light shield film having light reflectivity, which is formed simultaneously with the picture element electrode, may be formed by forming a metal film having light reflectivity on the liquid crystal layer side of the insulating film, and patterning the metal film. Consequently, light entering a switching element portion is shielded and reflected, whereby the intensity of the reflected light is increased and the luminance improved, thereby enhancing the display quality.

According to the invention, the insulating film has bumps on the surface thereof. Therefore, bumps corresponding to the bumps are formed on the surface of the picture element electrode and the light shield film which are formed on the insulating film. The bumps increase the intensity of light scattering in a direction vertical to the display screen with respect to light incident at any angle. Consequently, the intensity of the reflected light is further increased and the luminance is improved, thereby enhancing the display quality.

According to the invention, the bumps are randomly arranged. The bumps are formed into a tapered shape and their tip portions have a spherical shape. Further, the bumps are identical or different in size. Such bumps have the same effect as described above that the intensity of light scattering in the direction vertical to the display screen is increased.

According to the invention, a photosensitive resin is applied in a region including the switching element portions on the liquid crystal layer side of the insulating substrate, the photosensitive resin is exposed to light through light shield means in which circular light shielding regions are randomly arranged, developed and thereafter heat-treated, in order to obtain plural bumps. Subsequently, an insulating film is formed on and along plural bumps. On the surface of the insulating film, therefore, irregular bumps corresponding to the plural bumps formed by the photosensitive resin are formed. The bumps of the surface of the insulating film can be controlled easily and uniformly with excellent reproducibility. Since bumps are formed on the surfaces of the picture element electrodes and the light shield film in correspondence with the formed bumps, the reflectivity is improved.

BRIEF DESCRIPTION OF THE DRAWINGS

Other and further objects, features, and advantages of the invention will be more explicit from the following detailed description taken with reference to the drawings wherein:

FIGS. 4(1) to 4(5) are sectional views showing process steps of the forming method shown in FIG. 3;

FIGS. 7(1) to 7(6) are sectional views showing process steps of the forming method shown in FIG. 6;

FIGS. 14(1) to 14(6) are sectional views showing process steps of a method of forming the MIM 64;

DESCRIPTION OF THE PREFERRED EMBODIMENTS

Figure 1:
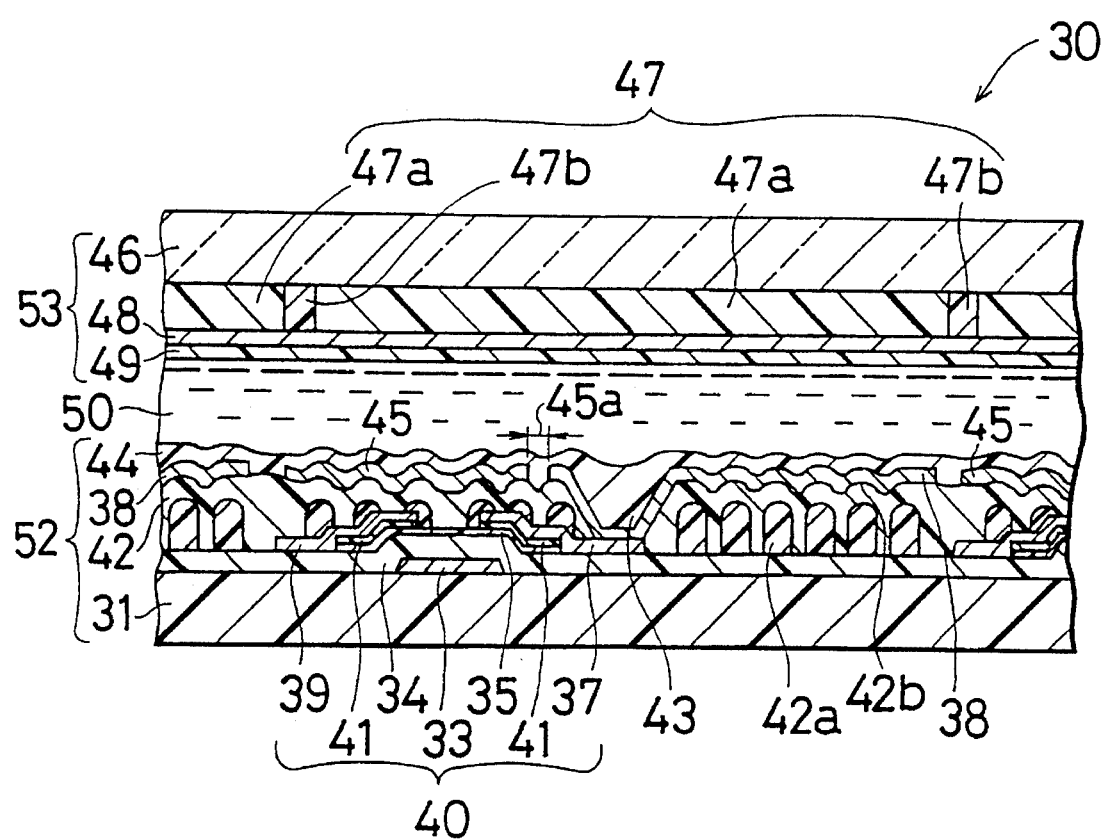
FIG. 1 is a sectional view showing a reflection type liquid crystal display device 30 which is an embodiment of the invention.

Now referring to the drawings, preferred embodiments of the invention are described below.

Figure 2:
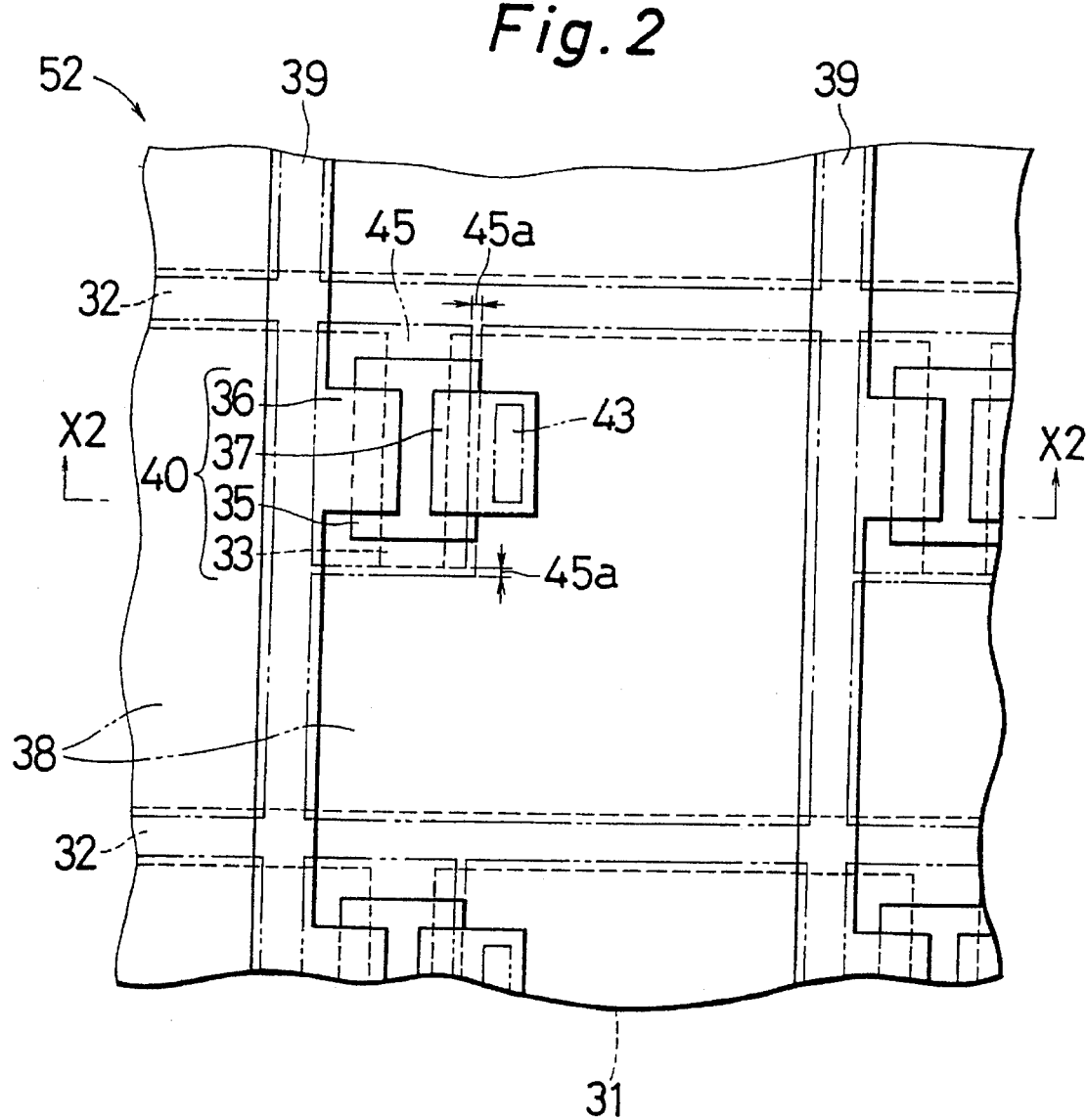
FIG. 2 is a plan view showing a substrate 52 constituting the reflection type liquid crystal display device 30.

FIG. 1 is a sectional view showing a reflection type liquid crystal display device 30 which is an embodiment of the invention, and FIG. 2 is a plan view showing a substrate 52 shown in FIG. 1. The reflection type liquid crystal display device 30 has a configuration wherein a liquid crystal layer 50 is interposed between substrates 52 and 53 at least one of which is light transmittable. The one substrate 52 comprises an insulating substrate 31, a TFT 40, an organic insulating film 42, a reflection electrode 38, a light shield film 45, and an orientation film 44. The other substrate 53 comprises a light transmitting insulating substrate 46, a color filter 47, a transparent electrode 48, and an orientation film 49.

On a surface of the insulating substrate 31 made of glass or the like on the side of the liquid crystal layer 50, plural gate bus wirings 32 made of chromium, tantalum or the like are disposed in parallel with each other, and a gate electrode 33 is branched off from the gate bus wiring 32. The gate bus wiring 32 functions as a scanning signal line.

Covering the gate electrode 33, a gate insulating film 34 made of silicon nitride ($SiN_x$), silicon oxide ($SiO_x$) or the like is formed on the entire surface of the insulating substrate 31 on the side of the liquid crystal layer 50. On the surface of the gate insulating film 34 above the gate electrode 33, formed is a semiconductor layer 35 made of a-Si, polycrystalline silicon, CdSe or the like. A contact electrode 41 made of a-Si or the like is formed on each of both ends of the semiconductor layer 35. A source electrode 36 made of titanium, molybdenum, aluminum or the like is superposed on one of the contact electrodes 41. A drain electrode 37 made of titanium, molybdenum, aluminum or the like in the same manner as the source electrode 36 is superposed on the other one of the contact electrodes 41.

As shown in FIG. 2, the source electrode 36 is connected to a source bus wiring 39. The source bus wiring 39 crosses the gate bus wiring 32 through the gate insulating film 34 therebetween, and functions as an image signal line. The source bus wiring 39 also is made of the same metal as that constituting the source electrode 36. The gate electrode 33, the gate insulating film 34, the semiconductor layer 35, the source electrode 36, and the drain electrode 37 constitute the TFT 40 which functions as a switching element.

On the TFT 40 and a surface of the gate insulating film 34 on the side of the liquid crystal layer 50 except a region where a contact hole 43 described below is to be formed, plural bumps 42a are formed at random positions. The bumps 42a may be formed in the following manner: First, the bumps 42a are formed on the entire surface, and then the bumps 42a formed in the region where the contact hole 43 is to be formed are removed. Alternatively, the bumps 42a may be originally inhibited from being formed in the region where the contact hole 43 is to be formed. The organic insulating film 42 is formed along the bumps 42a. Bumps 42b corresponding to the bumps 42a are formed on the organic insulating film 42. The contact hole 43 is formed by inhibiting the organic insulating film 42 from being formed in the region where the drain electrode 37 is formed.

The reflection electrode 38 made of aluminum, silver or the like, and the light shield film 45 similarly made of aluminum, silver or the like are formed on the organic insulating film 42. The reflection electrode 38 is connected to the drain electrode 37 through the contact hole 43. The light shield film 45 and the reflection electrode 38 are formed in such a manner that a gap is left therebetween to an extent that they can be electrically insulated from each other. On the reflection electrode 38 and the light shield film 45 which are formed on the organic insulating film 42, bumps corresponding to the bumps 42b of the organic insulating film 42 are formed. The orientation film 44 is formed on the reflection electrode 38 and the light shield film 45.

The light shield film 45 is formed almost right above the TFT 40. The reflection electrode 38 is formed in the region wherein no channel is formed on the interface with the semiconductor layer 35 of the TFT 40 in such a manner that it is separated from the light shield film 45 on the TFT 40 by a gap 45a and superposed on a part of the gate bus wirings 32 through the organic insulating film 42. Accordingly, the area of the reflection electrode 38 can be increased as far as it is electrically insulated from an adjacent reflection electrode 38. Therefore, the luminance of the display screen is improved, so that a bright display can be realized. In this way, the one substrate 52 is configured.

On the other hand, the color filter 47 is formed on the light transmitting insulating substrate 46 made of glass or the like on the side of the liquid crystal layer 50. The color filter, 47 includes filters 47a and 47b. The filter 47a of magenta or blue is formed in a region opposed to a picture element including the reflection electrodes 38 and the light shield film 45, and the filter 47b of black is formed in the other region. The transparent electrode 48 made of ITO or the like is formed on the entire surface of the color filter 47, and additionally the orientation film 49 is formed on the electrode 48. In the invention, since the light shield film 45 is formed on the TFT 40, the black filter 47b for shielding light is not required to be formed in the region of the counter substrate 53 which is opposed to the TFT 40. In this way, the other substrate 53 is configured.

The substrates 52 and 53 are arranged so that the orientation films 44 and 49 thereof face to each other, and then bonded with each other with being separated from each other by a predetermined distance. At this time, the substrates 52 and 53 are arranged so that the reflection electrode 38 and the light shield film 45 coincide with the filter 47a, and then bonded with each other. A liquid crystal is injected between the substrates to form the liquid crystal layer 50, thereby completing the reflection type liquid crystal display device 30. In the above, an embodiment of a color display using the color filter 47 has been described. In the case of a monochrome display, the display device can be configured in the same manner except that a color filter is not used. Therefore, the black filter 47b is not formed on the substrate 53 opposing the TFT 40 which is a switching element. It was confirmed that this configuration can improve the luminance.

Figure 3:
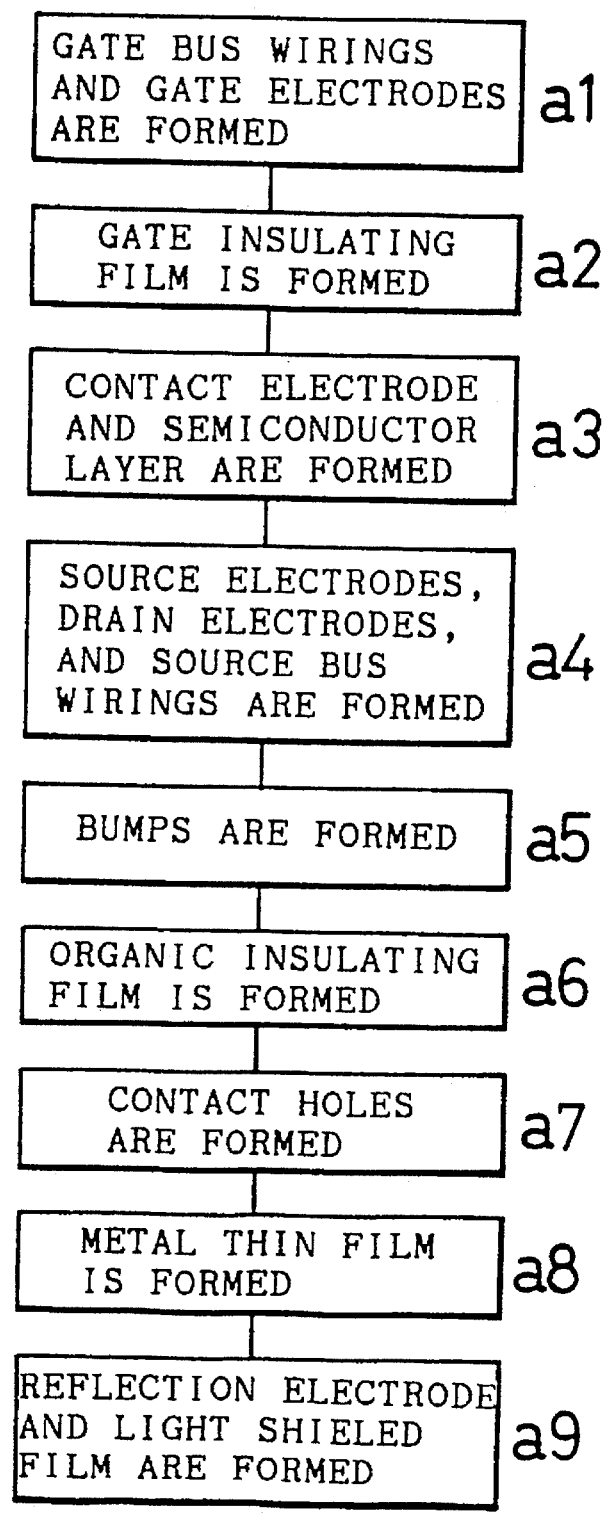
FIG. 3 is a process flow chart illustrating a method of forming a reflection electrode 38 and a light shield film 45 which have bumps.
Figure 5:
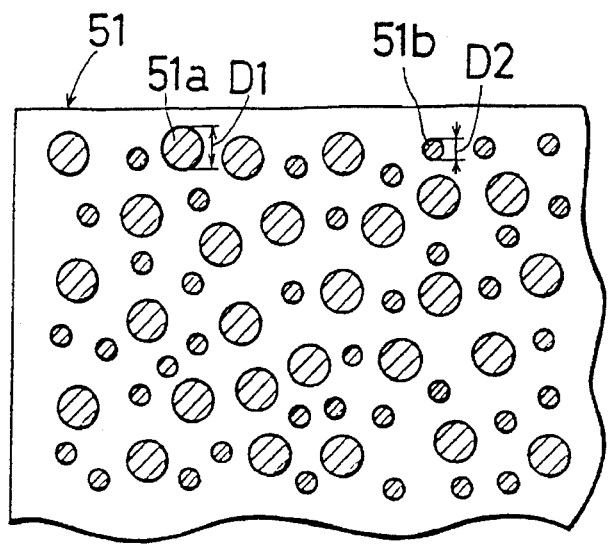
FIG. 5 is a plan view showing a mask 51 which is used in step a5 shown in FIG. 3.

FIG. 3 is a process flow chart illustrating a method of forming on the insulating substrate 31 the reflection electrode 38 and the light shield film 45 which have bumps shown in FIGS. 1 and 2, FIGS. 4 (1)–(5) are sectional views showing process steps of the forming method shown in FIG. 3, and FIG. 5 is a plan view showing a mask 51 which is used in step a5 shown in FIG. 3. FIG. 4(1) relates to step a4 of FIG. 3, FIG. 4(2) relates to step a5 of FIG. 3, FIG. 4(3) relates to step a6 of FIG. 3, FIG. 4(4) relates to step a8 of FIG. 3, and FIG. 4(5) relates to step a9 of FIG. 3.

In step a1, a metal layer of tantalum is first formed in a thickness of 3000 Å on the insulating substrate 31 made of glass or the like, by, for example, a sputtering method. Then, the metal layer is patterned into a predetermined shape by, for example, a photolithography method and an etching process, to form the gate bus wirings 32 and the gate electrode 33.

In step a2, the gate insulating film 34 made of silicon nitride ($SiN_x$) in a thickness of 4000 Å is formed by, for example, the plasma CVD method on the gate bus wirings 32, the gate electrode 33, and the insulating substrate 31.

In step a3, first, a 1000 Å thick a-Si layer to serve as the semiconductor layer 35, and a 400 Å thick n$^+$type a-Si layer to serve as the contact electrode 41 are formed in this sequence on the surface of the gate insulating film 34. Then, the formed n$^+$type a-Si layer and a-Si layer are sequentially patterned to form the contact electrode 41 and the semiconductor layer 35.

In step a4, first, a 2000 Å metal layer of molybdenum is formed by, for example, the sputtering method on the surfaces of the contact electrode 41, the semiconductor layer 35, and the gate insulating film 34. Then, the formed metal layer of molybdenum is patterned into a predetermined shape to form the source electrode 36, the drain electrode 37, and the source bus wirings 39. In this way, the TFT 40 is completed. FIG. 4(1) is a sectional view showing the insulating substrate 31 on which the TFT 40 is formed after being subjected to processes of steps a1 to a4.

In step a5, photo resist (trade name: OFPR-800, manufactured by Tokyo Ohka Kogyo Co., LTD) which is a photosensitive resin is applied in a thickness of 1.2 μm onto the TFT 40 and the gate insulating film 34, to form the bumps 42a as shown in FIG. 4(2) by using the mask 51 shown in FIG. 5. Specifically, the mask 51 is placed on the applied photo resist film, exposed, developed, and then heat-treated. In the mask 51, circular light shielding regions 51a and 51b shown by hatching and being different in size are randomly formed. The light shielding resin 51a is formed so that the diameter D1 of the light shielding regions 51a is greater than the diameter D2 of the light shielding regions 51b. For example, the diameter D1 is 10 μm and the diameter D2 is 5 μm.

In the embodiment, the mask 51 having two light shielding regions 51a and 51b different in size is employed. However, the mask 51 is not restricted to this. The mask 51 having light shielding regions which consist of one type of circles may be used, or the mask 51 having light shielding regions which consist of three or more types of circles may be used. When the mask 51 in which the light shielding regions 51a and 51b are not formed in the region where the contact hole 43 is to be formed is used, the bumps 42a are not formed in the region where the contact hole 43 is to be formed. In the case where the bumps 42a are formed on the entire surface, the bumps 42a in the region where the contact hole 43 is to be formed are thereafter removed. The bumps 42a in the resion may be removed after step a5, for example, upon the completion of step a5 or during the formation of the contact hole 43 in step a7 described below.

In step a6, a photosensitive resin which is realized by the above-mentioned photo resist (trade name: OFPR-800, Tokyo Ohka Kogyo Co., LTD) is applied preferably in a thickness of 2 μm or more along the bumps 42a, thereby forming the organic insulating film 42 as shown in FIG. 4(3). The bumps 42b corresponding to the bumps 42a are formed on the organic insulating film 42.

In step a7, the contact hole 43 is formed in the organic insulating film 42 by, for example, the photolithography method. The contact hole 43 is formed above the drain electrode 37. It was confirmed that the photosensitive resin which is realized by photo resist functions as an insulating film in a sufficient manner.

In step a8, a metal thin film 38a made of aluminum is formed on the entire surface of the organic insulating film 42 having the bumps 42b as shown in FIG. 4(4).

In step a9, as shown in FIG. 4(5), the metal thin film 38a is patterned to form the reflection electrode 38 and the light shield film 45. When the metal thin film 38a is formed by using a mask having the patterns of the reflection electrode 38 and the light shield film 45, steps a8 and a9 can be conducted simultaneously. The gap 45a between the reflection electrode 38 and the light shield film 45 is selected preferably to be 3 μm, and more preferably to be 5 μm. It was confirmed that, when the gap is greater than 3 μm, electrical insulation is kept therebetween. The reflection electrode 38 is connected to the drain electrode 37 of the TFT 40 through the contact hole 43 formed in the organic insulating film 42. It was confirmed that, in the formation of the reflection electrode 38 and the light shield film 45, the bumps 42a composed of the photo resist and the bumps 42b composed of the organic insulating film 42 are free from any change even when they undergo the steps of exposure, development, etching aluminum, and peeling the photo resist.

It was confirmed that the shape of the bumps 42a can be controlled by the shape of the mask 51, and the thickness of the photo resist which will be formed as the bumps 42a. Sharp edges of the bumps 42a may be removed easily by heat treatment after the formation of the bumps 42a. Through the heat treatment, the bumps 42a are formed to have a tapered shape and have spherical tip portions thereof. The thus formed bumps 42a are uniform, and can be controlled easily and with excellent reproducibility. Therefore, the reflectivity is improved.

The transparent electrode 48 formed on the insulating substrate 46 shown in FIG. 1 is made of, for example, ITO, and a thickness thereof is selected to be 1000 Å. The orientation films 44 and 49 on the reflection electrode 38, the light shield film 45, and the transparent electrode 48 are formed by applying and baking polyimide or the like. Between the substrates 52 and 53, a gap into which the liquid crystal is to be injected is formed by screenprinting of an adhesive sealant (not shown) in which spacers of, for example, 8 or 12 μm are mixed, and bonding the substrates 52 and 53 to each other. The space is evacuated and then returned to atmospheric pressure, whereby the liquid crystal is injected thereto. As the liquid crystal, for example, used is a mixture of guest-host liquid crystal mixed with black pigment (trade name: ZLI2327, manufactured by Merck) and 4.5% of an optical active substance (trade name: S811, manufactured by Marck).

Figure 6:
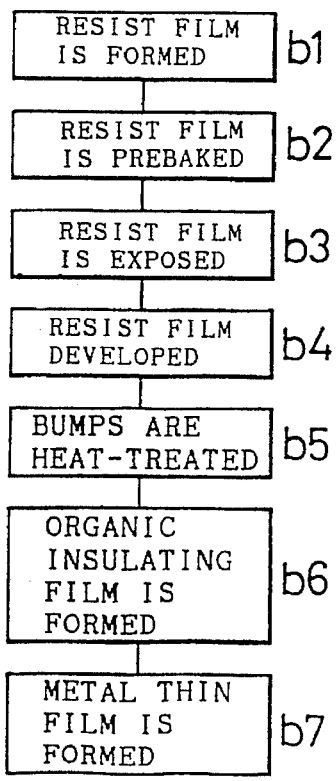
FIG. 6 is a process flow chart illustrating a method of forming a reflector 70 which is used in a measurement of the reflective characteristic of the reflection type liquid crystal display device 30.

FIG. 6 is a process flow chart illustrating a method of forming a reflector 70 which is used in a measurement of the reflective characteristic of the reflection type liquid crystal display device 30, and FIGS. 7 (1)–(6) are sectional views showing process steps of the forming method shown in FIG. 6. In step b1, as shown in FIG. 7(1), a photo resist (trade name: OFPR-800, manufactured by Tokyo Ohka Kogyo Co., LTD) which is a photosensitive resin is applied to one surface of a 1.1 mm thick glass substrate (trade name: 7059, manufactured by Corning) 71, to form a resist film 72. The application of the photo resist is conducted by a spin coating method in which the number of revolutions ranges from 500 to 3000 rpm. In the embodiment, the photo resist was applied at 3000 rpm for 30 seconds to form the 1.2 μm thick resist film 72. In step b2, the resist film 72 is prebaked at 100° C. for 30 minutes. In step b3, as shown in FIG. 7(2), the mask 51 having the circular light shielding regions 51a and 51b is placed on the resist film 72 and exposed. In step b4, as shown in FIG. 7(3), the resist film 72 is developed to form random circular bumps 74 on the surface of the glass substrate 71. In the embodiment, 2.38% NMD-3 (manufactured by Tokyo Ohka Kogyo Co., LTD) was used as the developing solution.

In step b5, the bumps 74 on the glass substrate 71 are subjected to a heat treatment at a temperature of preferably 120° to 250° C. to obtain smooth ones without sharp edges as shown in FIG. 7(4). In the embodiment, the heat treatment was conducted at 180° C. for 30 minutes. In step b6, as shown in FIG. 7(5), an organic insulating film 74a is formed along the bumps 74. As the organic insulating film 74a, for example, the above-mentioned photo resist is used. The photo resist is applied by a spin coating method in which a number of revolutions is selected to be in the range of 920 to 3500 rpm and a time to be 20 seconds. In the embodiment, the photo resist was applied at 2200 rpm for 20 seconds to form the organic insulating film 74a of 1 μm thick. Bumps corresponding to the bumps 74 are formed on the organic insulating film 74a, but they are smoother than the bumps 74.

In step b7, as shown in FIG. 7(6), a metal thin film 75 is formed on the organic insulating film 74a. The thickness of the metal thin film 75 is selected to be about 0.01 to 1.0 μm. In the embodiment, the metal thin film 75 was formed by vacuum deposition of aluminum. As the metal thin film 75, useful are aluminum, nickel, chromium, silver, copper, etc. Since the metal thin film 75 is formed on the organic insulating film 74a formed along the bumps 74, the metal thin film 75 has random circular bumps 75a corresponding to the bumps 74a. The reflector 70 is formed in such a manner.

Figure 8:
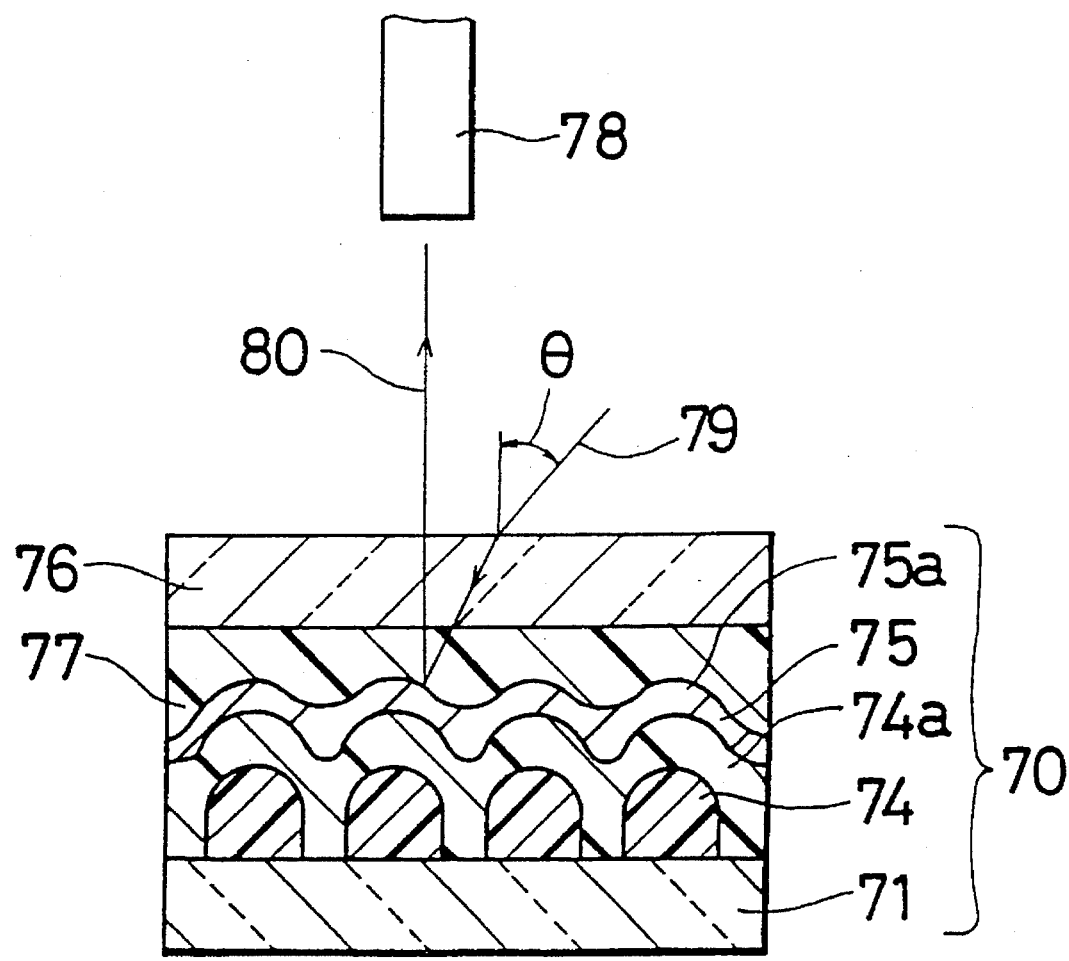
FIG. 8 is a sectional view illustrating the measurement of the reflective characteristic.

FIG. 8 is a sectional view illustrating the measurement of the reflective characteristic. Usually, the insulating substrates 31 and 46 made of glass or the like and the liquid crystal layer 50 which are used in the liquid crystal display device 30 have a refractive index of 1.5. In the embodiment, assuming a constitution in which the surface of the metal thin film 75 of the reflector 70 contacts with the liquid crystal layer 50, a glass substrate 76 was tightly contacted with the metal thin film 75 of the reflector 70 by using an ultraviolet setting resin 77 having a refractive index of 1.5, and the reflective characteristic of the reflector 70 is measured. It is confirmed that this measurement gives the same results as the reflective characteristic of the interface between the surface of the metal thin film 75 of the reflector 70 and the liquid crystal layer 50.

As shown in FIG. 8, the reflective characteristic is measured by detecting scattered light 80 of incident light 79 entering the reflector 70 by means of a photo multimeter 78. The incident light 79 enters the reflector 70 at an angle θ to the normal line of the reflector. The photo multimeter 78 is fixed in the normal direction of the reflector 70 passing the point of the metal thin film 75 where the incident light 79 enters. In order to obtain the reflective characteristic, the intensity of the scattered light 80 on the metal thin film 75 is measured by means of the photo multimeter 78 by varying the incident angle θ of the incident light to the metal thin film 75.

Figure 9:
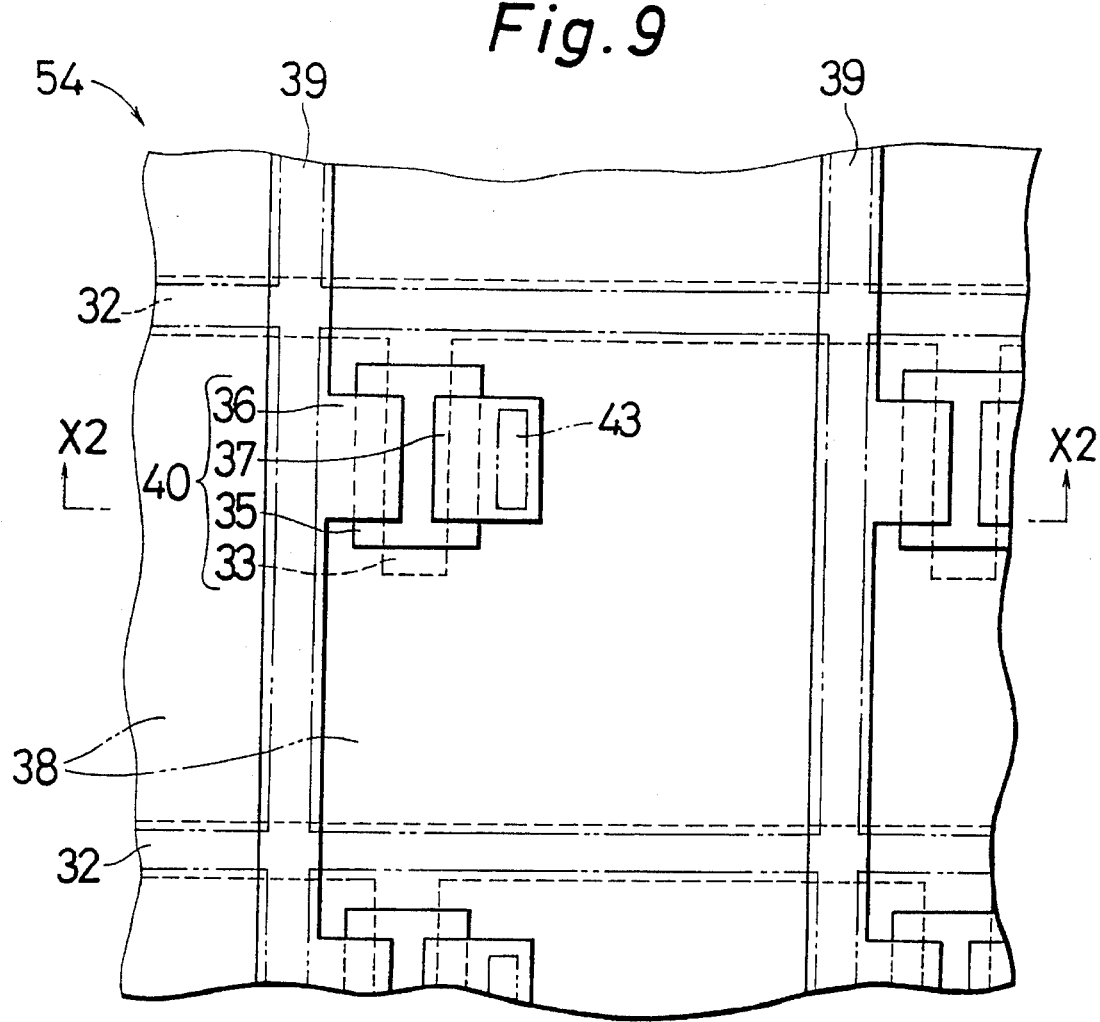
FIG. 9 is a plan view showing a substrate 54 of a liquid crystal display device which is a comparison example for an embodiment of the invention.
Figure 10:
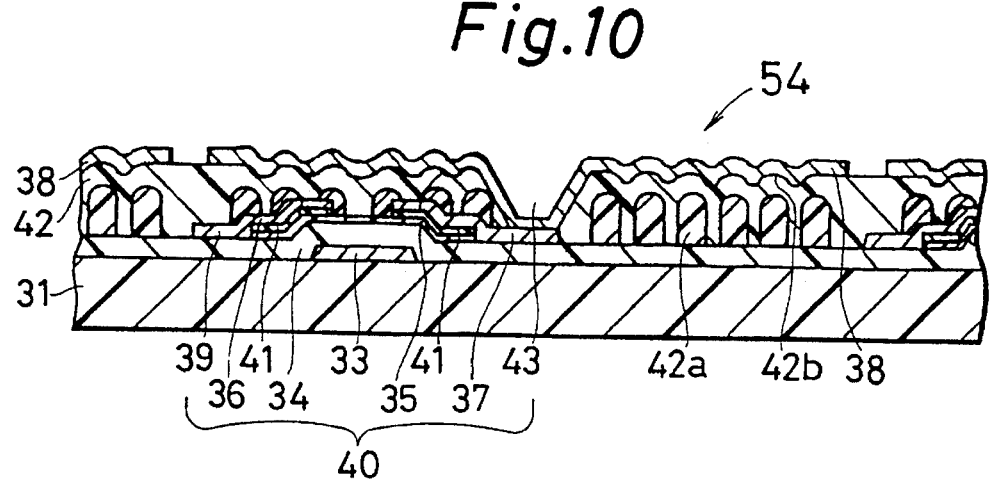
FIG. 10 is a sectional view taken along line X2—X2 shown in FIG. 9.

FIG. 9 is a plan view showing one substrate 54 of a liquid crystal display device which is a comparison example for the embodiment, and FIG. 10 is a sectional view taken along line X2—X2 of FIG. 9. In FIGS. 9 to 12, components having the same configuration as those of the embodiment are designated by the same reference numerals. The substrate 54 of the liquid crystal display device which is a comparison example is configured in an almost same manner as the substrate 52. On the substrate 31 which constitutes the substrate 54, the gate bus wirings 32, the source bus wirings 39, and the TFT 40 are formed in the same manner as the embodiment, and the organic insulating film 42 having bumps 42a and the contact hole 43 is further formed. The reflection electrode 38 is formed on the organic insulating film 42 and also on the TFT 40. The reflection electrode 38 is connected to the drain electrode 37 through the contact hole 43. The comparison example shown in FIGS. 9 and 10 is described in detail in Japanese Patent Application No. HEI4-230082 in the name of the assignee of the present application.

Figure 11:
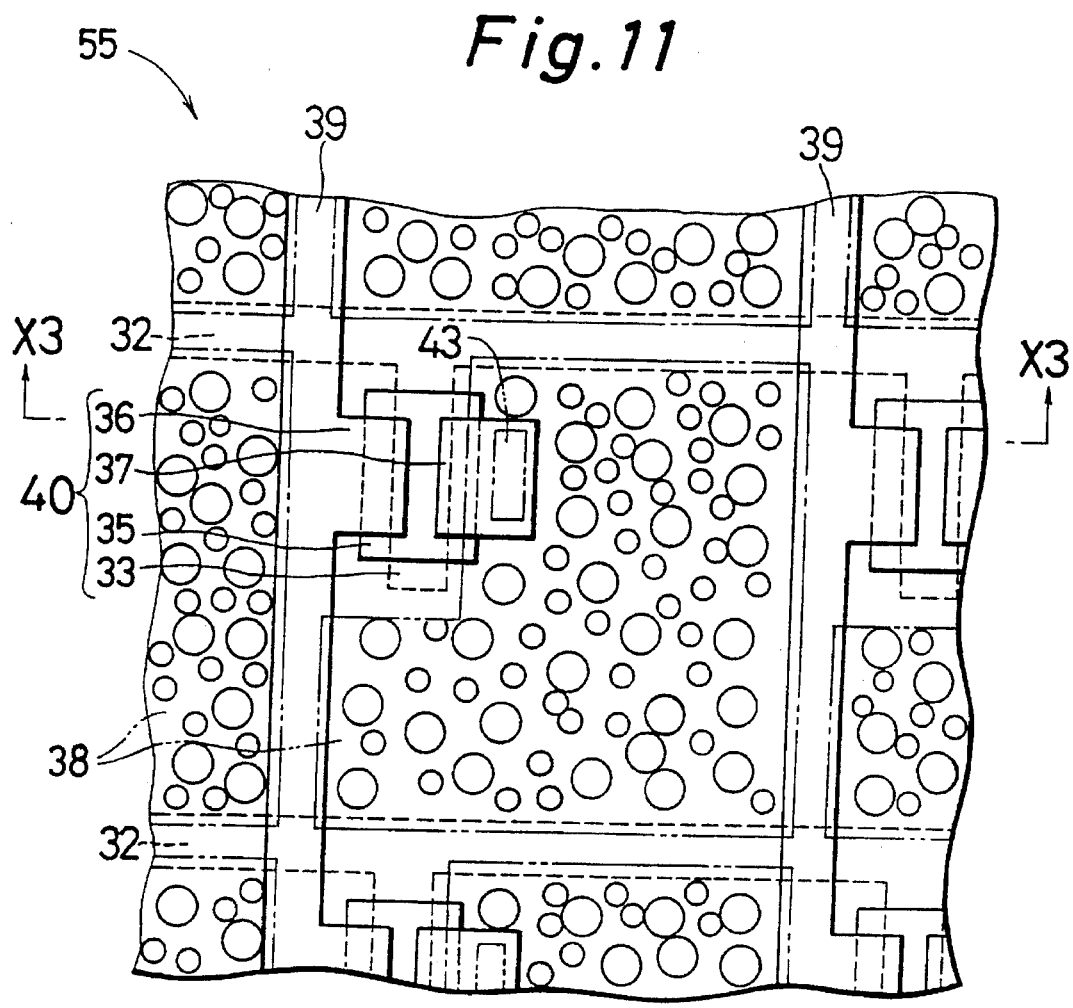
FIG. 11 is a plan view showing a substrate 55 of a liquid crystal display device which is another comparison example for the embodiment.
Figure 12:
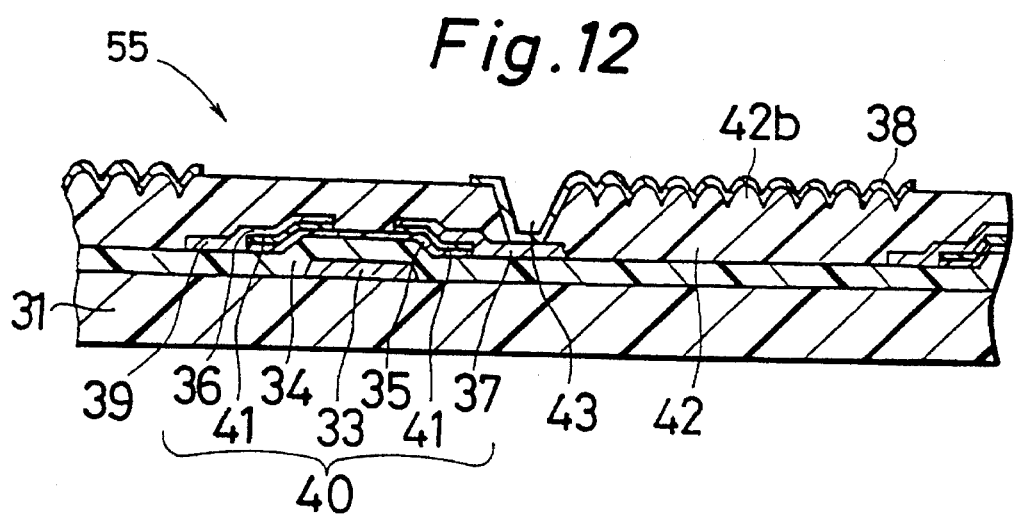
FIG. 12 is a sectional view taken along line X3—X3 shown in FIG. 11.

FIG. 11 is a plan view showing the other substrate 55 of a liquid crystal display device which is another comparison example, and FIG. 12 is a sectional view taken along line X3—X3 of FIG. 11. Also the substrate 55 of the liquid crystal display device which is the comparison example is configured in an almost same manner as the substrate 52. On the substrate 31 which constitutes the substrate 55, the gate bus wirings 32, the source bus wirings 39, and the TFT 40 are formed in the same manner as the embodiment, and the organic insulating film 42 having bumps 42a and the contact hole 43 is further formed and the reflection electrode 38 is formed. However, neither the bumps 42a of the organic insulating film 42 nor the reflection electrode 38 are formed on the TFT 40. The reflection electrode 38 is connected to the drain electrode 37 through the contact hole 43. The comparison example shown in FIGS. 11 and 12 is described in detail in Japanese Patent Application No. HEI3-230608 in the name of the assignee of the present application.

The orientation film 44 is not shown in FIGS. 9 to 12 showing the comparison examples.

In the comparison example shown in FIGS. 9 and 10, the area of the reflection electrode 38 can be increased as compared with that of the prior art, and therefore the luminance is improved. Since the reflection electrode 38 is formed on the TFT 40, however, the reflection electrode 38 conducts in a pseudo manner the same function as that of the gate electrode 33, so that a channel (current path) is formed in the interface between the reflection electrode 38 and the semiconductor layer 35, thereby producing a possibility of impairing the characteristics of the TFT 40. Furthermore, a relatively large parasitic capacitance is caused between the gate electrode 33 and the reflection electrode 38, which leads to impairing the display quality.

In the comparison example shown in FIGS. 11 and 12, the reflection electrode 38 is not formed on the TFT 40, and therefore the above-mentioned problems of the reduced characteristics of the TFT 40 and the generation of the parasitic capacitance will not be caused. However, the luminance is lowered because the area of the reflection electrode 38 is small. When light enters the TFT 40, moreover, there arises a problem in that the TFT 40 cannot properly function as a switching element.

In the embodiment, since the light shield film 45 is formed on the TFT 40, light is prevented from entering the TFT 40. Consequently, such inconvenience that the TFT 40 cannot properly function as a switching element does not occur. The light shield film 45 is made of a reflective substance such as aluminum or silver, and bumps which increase the intensity of light scattering in the direction perpendicular to the display screen with respect to light incident at any angle are formed on the surface of the light shield film. Accordingly, light entering the light shield film 45 is reflected and the intensity of the reflected light is increased, so that the luminance is improved. Moreover, the light shield film 45 and the reflection electrode 38 are formed so as to be kept electrically insulated from each other, whereby the possibility that the characteristics of the TFT 40 are impaired is eliminated, and the generation of a parasitic capacitance is prevented.

It was confirmed that, in the embodiment, the inclination angle of the bumps 42a can be freely controlled by adequately selecting the type or film thickness of the photosensitive resin such as a photo resist constituting the bumps 42a, and the heat treatment temperature, and that this enables to control the dependence of the reflective intensity on the incident angle. In addition, it was confirmed that the reflective intensity can be controlled also by changing the type or film thickness of the photosensitive resin which is applied onto the bumps 42a to be formed as the organic insulating film 42. Furthermore, the level of the regular reflection component can be controlled by changing the ratio of the light shielding regions 51a and 51b to the area of the mask 51.

When a voltage was applied between the reflection electrode 38 and the transparent electrode 48, the reflectivity in the normal direction of the panel to incident light entering at an angle θ of 30° was about 20%, and the contrast ratio was 5.

In the liquid crystal display device 30 of the embodiment, the surface of the insulating substrate 31 on which the reflection electrode 38 and the light shield film 45 are formed is arranged on the liquid crystal layer side. Therefore, the parallax is eliminated, and an excellent display quality is obtained. The light shield film 45 can shield also light which obliquely enters, and can shield light regardless of the positional accuracy of the bonding of the substrates. In the embodiment, the reflection electrode 38 and the light shield film 45 are formed in a location almost adjacent to the liquid crystal layer, and therefore it is preferable to set the height of the bumps 42b to be smaller than the cell thickness, and the inclination angle of the bumps 42b to be gentle so that the orientation of the liquid crystal is not disturbed.

In the embodiment, the photosensitive resin to function as the organic insulating film 42 is patterned by the photolithography method. When the photosensitive resin is a polyimide resin, it may be patterned by a wet etching method using an alkaline solution, or a dry etching method. As the photosensitive resin, a photo resist (trade name: OFPR-800, manufactured by Tokyo Ohka Kogyo Co., LTD) was used. The type of the photosensitive resin is not restricted to this. Any resin such as a photosensitive acrylic resin, or a photosensitive polyimide resin may be used in the embodiment, as far as it is photosensitive. Further, the organic insulating film 42 may be made of not only a light transmitting material, but also an opaque material. For example, a black resist material (trade name: Color Mosaic CK, manufactured by Fuji Hanto Electronics-sha) can be selected as such opaque material. The light incident on the TFT 40 can be almost eliminated by employing the opaque material, and therefore the problem that the TFT 40 fails to adequately function as a switching element is solved. Further, in place of a light transmitting substrate made of glass or the like, an opaque substrate such as a silicon substrate may be used as the insulating substrate 31 with achieving the same effects. In this case, there is an advantage that circuits can be integrated on the substrate.

Figure 13:
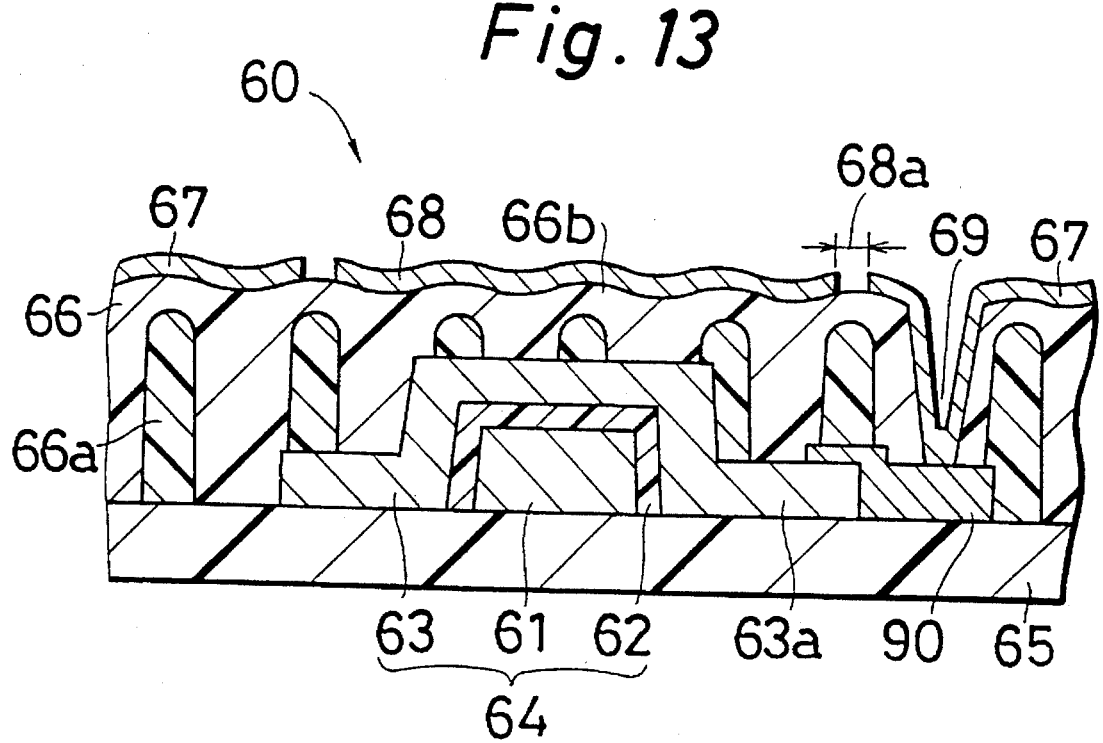
FIG. 13 is a sectional view showing a substrate 60 on which a MIM 64 is formed in a reflection type liquid crystal display device that is another embodiment of the invention.
Figure 15:
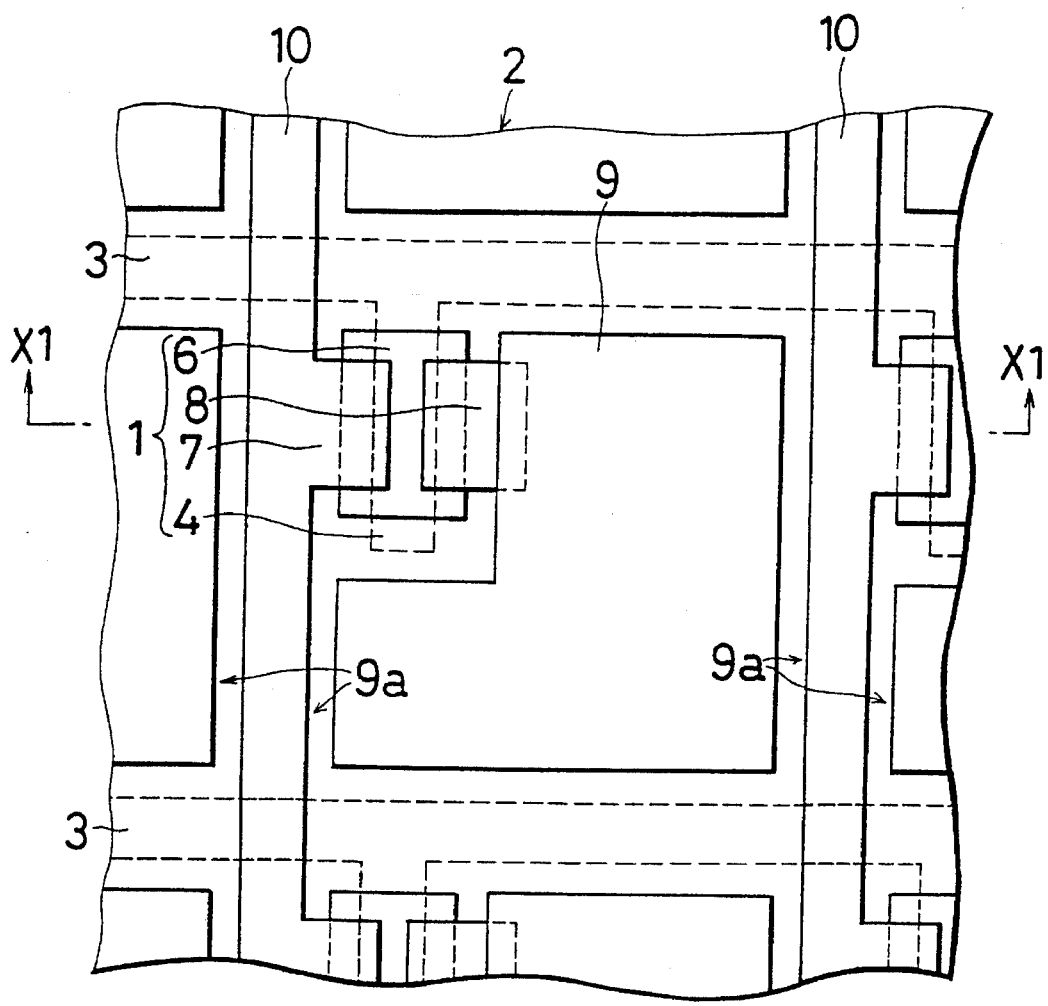
FIG. 15 is a plan view showing an insulating substrate 2 having a thin film transistor 1.
Figure 16:
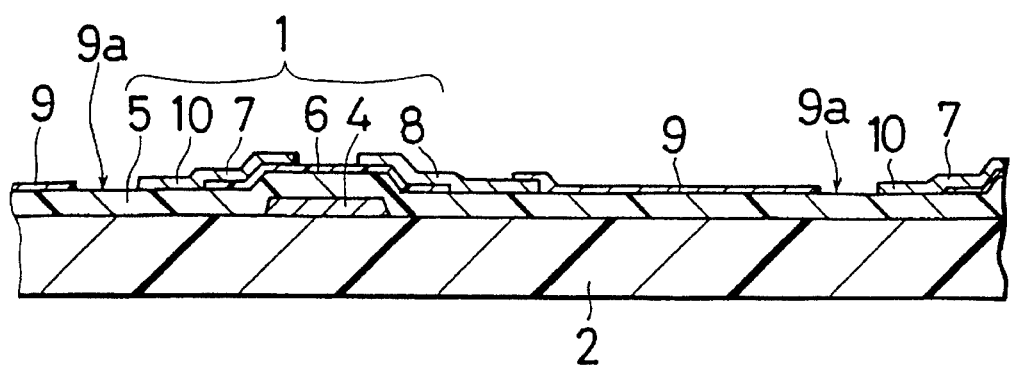
FIG. 16 is a sectional view taken along line X1—X1 of FIG. 15.

FIG. 13 is a sectional view showing one substrate 60 on which a MIM (metal-insulator-metal) 64 is formed and which is used in a reflection type liquid crystal display device that is another embodiment of the invention. The substrate 60 comprises an insulating substrate 65, a MIM element 64, an organic insulating film 66, a reflection electrode 67, and a light shield film 68. The substrate 60 is arranged so as to be opposed to the other light transmitting substrate which is not shown, through a liquid crystal layer. A lower electrode 61 made of, for example, tantalum (Ta) is arranged on the liquid crystal layer side of the insulating substrate 65 made of glass or the like. Although tantalum was employed as the lower electrode 61 in the embodiment, any metal such as niobium (Nb) which can be anodically oxidized may be used for the electrode. An insulating film 62 made of, for example, tantalum oxide ($Ta_2O_5$) is formed on the surface of the lower electrode 61. An upper electrode 63 made of, for example, chromium (CF) is formed on the surface of the insulating film 62. Although chromium was used as the upper electrode 63 in the embodiment, the material of the upper electrode 63 is not restricted to this, and another metal such as tantalum, titanium, or aluminum may be used. The lower electrode 61, the insulating film 62, and the upper electrode 63 constitute the MIM 64 which functions as a switching element.

An electrode 90 made of ITO or the like is connected to one end 63a of the upper electrode 63. On the insulating substrate 65 on which the MIM 64 and the electrode 90 are formed, plural bumps 66a corresponding to the above-mentioned bumps 42a are randomly formed except a region where a contact hole 69 described below is to be formed. The bumps 66a may be formed on the entire surface, and then the bumps 66a formed in the region where the contact hole 69 is to be formed are removed. Alternatively, the bumps 66a may be originally inhibited from being formed in the region where the contact hole 69 is to be formed. An organic insulating film 66 corresponding to the organic insulating film 42 is formed along the bumps 66a. Bumps 66b corresponding to the bumps 66a are formed on the organic insulating film 66. The contact hole 69 is formed by inhibiting the organic insulating film 66 from being formed in the region where the electrode 90 is formed.

A reflection electrode 67 made of aluminum, silver or the like is formed on the organic insulating film 66 except the region where the MIM 64 is formed. A light shield film 68 made of aluminum, silver or the like in the same manner as the reflection electrode 67 is formed in the region where the MIM 64 is formed. The reflection electrode 67 is connected to the electrode 90 through the contact hole 69. In the same manner as the reflection electrode 38, the area of the reflection electrode 67 can be increased as far as it is electrically insulated from adjacent reflection electrodes 67. The light shield film 68 and the reflection electrode 67 are formed so as to be separated from each other by such an extent of gap that they can be electrically insulated from each other. On the reflection electrode 67 and the light shield film 68, bumps corresponding to the bumps 66b of the organic insulating film 66 are formed. An orientation film (not shown) is formed on the reflection electrode 67 and the light shield film 68. In the same manner as the foregoing embodiment, the substrate is bonded through a liquid crystal layer to the other substrate comprising a light transmitting insulating substrate, a color filter, a transparent electrode, and an orientation film, thereby constituting a reflection type liquid crystal display device.

FIGS. 14 (1)–(6) are sectional views showing process steps of a method of forming the MIM 64. As shown in FIG. 14(1), a Ta film to function as the lower electrode 61 is formed on the insulating substrate 65 by, for example, the sputtering method. A resist film 91 is formed on the formed Ta film as shown in FIG. 14(2), and exposure and developing processes are conducted to pattern the resist film 91 as shown in FIG. 14(3). The exposed Ta film is etched away, and then the resist film 91 is peeled off. As shown in FIG. 14(4), the Ta film is then patterned to form the lower electrode 61.

Thereafter, the insulating film 62 is formed as shown in FIG. 14(5). In the formation of the insulating film 62, usually, the anodic oxidation method is used. The anodic oxidation method is a technique in which a metal is used as an anode in an adequate electrolytic solution and a current flows between the anode and a cathode to form an oxide on the surface of the anode. As the electrolytic solution, useful is a weak acid such as phosphoric acid, boric acid, or tartaric acid, or a dilute aqueous solution of an ammonium salt thereof. In the embodiment, Ta is converted to $Ta_2O_5$ by the anodic oxidation method to obtain the insulating film 62. A chromium film which will function as the upper electrode 63 is formed on the formed insulating film 62 as shown in FIG. 14(6). The upper electrode 63 is formed by, for example, the sputtering method. In this way, the MIM 64 consisting of the lower electrode 61, the insulating film 62, and the upper electrode 63 is formed.

In the MIM 64, unlike the above-mentioned TFT 40, a material which generates a large photoelectric current is not used. Therefore, it is not necessary to shield the MIM 4 against light. When, like the present embodiment, the light shield film 68 having light reflectivity is formed on the MIM 64, the intensity of the reflected light is increased and the luminance is improved. Since the reflection electrode 67 and the light shield film 68 are separated from each other by the gap 68a, furthermore, a signal applied to the reflection electrode 67 is not applied to the upper electrode 63 of the MIM 64, and therefore the characteristics of the MIM 64 are prevented from being impaired.

In the embodiment, any resin such as a photosensitive acrylic resin, or a photosensitive polyimide resin may be used as the organic insulating film 66, as far as it is photosensitive. In place of light transmitting substrate made of glass or the like, an opaque substrate such as a silicon substrate may be used for the insulating substrate 65 with achieving the same effects. In this case, there is an advantage that circuits can be integrated on the substrate.

As a display mode, a phase transition type guest-host mode was used in the embodiment. The display mode is not restricted to this. For example, the configuration of the invention in which a reflection type active matrix substrate is used can be applied to another light absorption mode such as a two-layer guest-host mode, a light scattering type display mode used in a polymer dispersion type liquid crystal display device, or a birefringence display mode used in a ferroelectric liquid crystal display device. Although the embodiments using a TFT or a MIM element as a switching element, the invention may be applied also to an active matrix substrate of another type using, for example, a diode, or a varistor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for manufacturing a reflection type liquid crystal display device wherein one of a pair of substrate members confronting each other through a liquid crystal layer includes an insulating substrate, a picture element electrode which is formed in each of plural picture element regions on the liquid crystal layer side of the insulating substrate and functions as a reflector for reflecting light entering from the other light transmitting substrate member side, and a switching element portion for applying a voltage for displaying to the picture element electrode, the switching element portion which is arranged individually for each picture element region, the method comprising the steps of:

forming an insulating film having a contact hole on the switching element portion on the insulating substrate wherein the switching element portion is formed;

forming a metallic film having a light reflecting property on the entire surface of the insulating film; and patterning the metallic film to form a light shield element and the picture element electrode in such a manner that the picture element electrode is contacted with the switching element portion via the contact hole, and the light shield element is disposed above the switching element portion and is separated from the picture element electrode by a gap.

2. A method for manufacturing a reflection type liquid crystal display device wherein one of a pair of substrate members confronting each other through a liquid crystal layer includes an insulating substrate, a picture element electrode which is formed in each of plural picture element regions on the liquid crystal layer side of the insulating substrate and functions as a reflector for reflecting light entering from the other light transmitting substrate member side, and a switching element portion for applying a voltage for displaying to the picture element electrode, the switching element portion which is arranged individually for each picture element region, the method comprising the steps of:

forming an insulating film having a contact hole on the switching element portion on the insulating substrate wherein the switching element portion is formed;

forming bumps on the surface of the insulating film;

forming a metallic film having a light reflecting property on the entire surface of the insulating film; and patterning the metallic film to form a light shield element and the picture element electrode in such a manner that the picture element electrode is contacted with the switching element portion via the contact hole, and the light shield element is disposed above the switching element portion and is separated from the picture element electrode by a gap 3. A method for manufacturing a reflection type liquid crystal display device wherein one of a pair of substrate members confronting each other through a liquid crystal layer includes an insulating substrate, a picture element electrode which is formed in each of plural picture element regions on the liquid crystal layer side of the insulating substrate and functions as a reflector for reflecting light entering from the other light transmitting substrate member side, and a switching element portion for applying a voltage for displaying to the picture element electrode, the switching element portion which is arranged individually for each picture element region, the method comprising the steps of:

applying a photosensitive resin to the insulating substrate where the switching element portion is formed;

exposing the photosensitive resin via light shielding means wherein circular light shield regions are irregularly arranged;

thermally treating the photosensitive resin after development;

forming an insulating film having a contact hole on the switching element portion along the surface of the photosensitive resin with the plural bumps;

forming a metallic film having a light reflecting property on the entire surface of the insulating film; and patterning the metallic film to form a light shield element and the picture element electrode in such a manner that the picture element electrode is contacted with the switching element portion via the contact hole, and the light shield element is disposed above the switching element portion and is separated from the picture element electrode by a gap.

* * * * *